(12) United States Patent
Han et al.

(10) Patent No.: US 12,458,026 B2
(45) Date of Patent: Nov. 4, 2025

(54) PESTICIDE COMPOSITIONS

(71) Applicant: SPECIALTY OPERATIONS FRANCE, Lyons (FR)

(72) Inventors: Zhichao Han, Shanghai (CN); Yuming Zhou, Jiangsu (CN); Zixian Chen, Singapore (SG); Young Hoon Seo, Seoul (KR)

(73) Assignee: SPECIALTY OPERATIONS FRANCE, Lyons (FR)

(*) Notice: Subject to any disclaimer, the term of this patent is extended or adjusted under 35 U.S.C. 154(b) by 0 days.

(21) Appl. No.: 16/628,152

(22) PCT Filed: Jul. 5, 2018

(86) PCT No.: PCT/CN2018/094645
§ 371 (c)(1),
(2) Date: Jan. 2, 2020

(87) PCT Pub. No.: WO2019/007393
PCT Pub. Date: Jan. 10, 2019

(65) Prior Publication Data
US 2020/0128831 A1 Apr. 30, 2020

(30) Foreign Application Priority Data
Jul. 6, 2017 (WO) ................ PCT/CN2017/092083

(51) Int. Cl.
*A01N 57/20* (2006.01)
*A01N 25/02* (2006.01)

(52) U.S. Cl.
CPC ............. *A01N 57/20* (2013.01); *A01N 25/02* (2013.01)

(58) Field of Classification Search
CPC ................................ A01N 57/20; A01N 25/02
See application file for complete search history.

(56) References Cited

U.S. PATENT DOCUMENTS

| 5,491,125 | A | 2/1996 | Albrecht et al. | |
| 9,307,757 | B2 | 4/2016 | Nguyen et al. | |
| 2007/0155628 | A1* | 7/2007 | Pazhianur | A01N 57/20 |
| | | | | 504/116.1 |
| 2013/0171226 | A1* | 7/2013 | Awazu | A01N 25/04 |
| | | | | 514/355 |

FOREIGN PATENT DOCUMENTS

| CN | 101773142 A | 7/2010 |
| CN | 102573458 A | 7/2012 |
| CN | 106359445 A | 2/2017 |
| CN | 106386805 A | 2/2017 |
| CN | 106614717 A | 5/2017 |
| CN | 106689124 A | 5/2017 |
| EP | 0577914 A1 * | 1/1994 |
| JP | 2002097102 A | 4/2002 |
| WO | 2007059107 A2 | 5/2007 |

OTHER PUBLICATIONS

Machine Translation of CN106386805A.
Machine Translation of CN106614717A.
Machine Translation of CN102573458.
Machine Translation of JP2002097102A.
Machine Translation of CN106689124A.
Machine Translation of CN106359445A.
Machine Translation of CN101773142A.

* cited by examiner

*Primary Examiner* — Bethany P Barham
*Assistant Examiner* — Danielle Johnson
(74) *Attorney, Agent, or Firm* — Osha Bergman Watanabe & Burton LLP

(57) ABSTRACT

Providing a pesticidal composition which comprises (a) an effective amount of a pesticide; (b) a sulfosuccinate surfactant component; and (c) an additional surfactant.

12 Claims, No Drawings

PESTICIDE COMPOSITIONS

This application claims priority to PCT International Patent Application No. PCT/CN2017/092083 filed on Jul. 6, 2017, the whole content of which being incorporated herein by reference for all purposes.

TECHNICAL FIELD

The present invention relates to a pesticidal composition which contains a pesticide active ingredient and surfactants.

BACKGROUND ART

In modern agricultural production, pesticides are widely used. Among pesticides, herbicides are used for controlling growth of unwanted plants (weeds) in the field. Herbicidal compositions are often characterized according to the identity of active ingredients, and by the mode through which the active ingredients cause vegetation necrosis. Regardless of the active ingredient, most herbicides cause vegetation necrosis by interfering with one or more vital biological processes that are essential to the vegetation's survival. Yet, before the active ingredient of a herbicide can interfere with such biological processes, the active ingredient must somehow be absorbed into the vegetation. Unfortunately, this absorption is often hindered by the chemical nature of the active ingredient.

Accordingly, in addition to the herbicidal active ingredient, most herbicidal compositions also include other components, commonly termed adjuvants, which enhance the performance and absorption of the active ingredient. One class of adjuvants that are frequently used is surfactants. Surfactants are useful in herbicidal compositions because they tend to enhance absorbing properties of the active ingredient, increase spreading of the active ingredient on weeds, such as on the weed leaves, facilitate application of the herbicide as well.

U.S. Pat. No. 9,307,757 B2 discloses a herbicidal formulation containing glufosinate and a monoalkyl sulfosuccinate hydrotrope. U.S. Pat. No. 5,491,125 discloses liquid herbicidal agents which contain glufosinate in combination with a surfactant, such as an alkylsulfosuccinic acid monoesters or fatty alcohol polyglycol ether sulfosuccinic acid monoesters.

One consideration in developing herbicidal formulations is that the formulations should have good spreadability and adhesion, which could allow the active ingredients, once applied onto plants, to spread quickly and uniformly on plant surfaces (such as on foliage). This would enable fast uptake of the active ingredients by the plants, thus result in good bioefficacy. In addition, it is also highly desirable that the formulations are sufficiently stable when the temperature alters, for example under high or low temperatures. Furthermore, it is desirable that the formulations have suitable viscosity. A too high viscosity causes difficulties in formulating while formulations with too low viscosity are not preferred by users as well.

It remains a challenge to provide a pesticidal composition which has satisfactory bioefficacy. It remains a challenge to provide a pesticidal composition which has good stability under varied temperature condition. It remains a challenge to provide a pesticidal composition which can be easily formulated. It remains a challenge to provide a pesticidal composition which provides satisfactory viscosity in combination with excellent efficacy, as well as good stability.

SUMMARY OF INVENTION

The present invention provides a pesticidal composition, notably a herbicidal composition, comprising at least:
(a) an effective amount of a pesticide;
(b) a sulfosuccinate surfactant component, comprising at least an aliphatic alcohol sulfosuccinic acid monoester and an aliphatic alcohol alkoxylate sulfosuccinic acid monoester; and
(c) an additional surfactant.

It has been found that the composition according to the present application has excellent bioefficacy coupled with good stability. The composition, when in liquid form, also shows satisfactory viscosity. The composition could lead to excellent efficacy in killing weeds. Also, the composition could remain stable under various temperatures, such as high and low temperatures. The composition could be readily formulated by a person with ordinary skills.

Preferably, the pesticide is one or more compounds selected from glufosinate, glyphosate, water soluble glufosinate salts and water soluble glyphosate salts.

The composition of the present invention may be in solid form or liquid form, in particular, in liquid form.

The present invention further provides a method for controlling undesired plants, such as weeds, which comprises applying the composition to the plants.

The present invention further provides use of the composition for controlling undesired plants, such as weeds.

DETAILED DESCRIPTION

Throughout the description, including the claims, the term "comprising one" or "comprising a" should be understood as being synonymous with the term "comprising at least one", unless otherwise specified. The terms "between" and "from . . . to . . . " should be understood as being inclusive of the limits.

The articles "a", "an" and "the" are used to refer to one or to more than one (i.e., to at least one) of the grammatical object of the article.

It should be noted that in specifying any range of concentration, weight ratio or amount, any particular upper concentration, weight ratio or amount can be associated with any particular lower concentration, weight ratio or amount, respectively.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "alkenyl" as a group or part of a group denotes an aliphatic hydrocarbon group containing at least one carbon-carbon double bond and which may be straight or branched. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the term "amidoalkyl" refers to an alkyl group, as defined above, bonded to the moiety —C(=O)NH— via either the carbon or the nitrogen, i.e., alkyl-C(=O)NH— or —NH(C=O)-alkyl.

As used herein, the terminology "($C_n$-$C_m$)" in reference to, an organic group, wherein n and m are each integers, indicates that the group may contain from n carbon atoms to m carbon atoms per group.

As used herein, the term "an effective amount" in reference to the relative amount of pesticide in a pesticidal composition means the relative amount that is effective to control growth of a target, such as a plant, when the pesticidal composition is applied to the target at a given application rate.

In one aspect, the present invention provides a pesticidal composition, notably a herbicidal composition, comprising:
(a) an effective amount of a pesticide;
(b) a sulfosuccinate surfactant component, comprising at least a compound according to the general formula (I) and a compound according to the general formula (II):

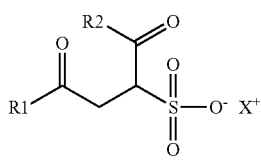
(I)

wherein:
one of $R_1$ and $R_2$ is

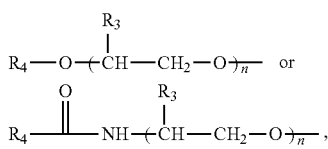

the other of $R_1$ and $R_2$ is —$OX^+$,
$R_3$ is H, $C_1$-$C_4$ alkyl, alkenyl, hydroxyalkyl or hydroxyalkenyl, such as methyl, ethyl, propyl, iso-propyl, butyl, and iso-butyl, preferably $R_3$ is H or methyl,
$R_4$ is $C_1$-$C_{22}$ alkyl, alkenyl, hydroxyalkyl or hydroxyalkenyl, preferably $C_1$-$C_{16}$ alkyl, alkenyl, hydroxyalkyl or hydroxyalkenyl, more preferably $C_4$-$C_{16}$ alkyl, alkenyl, hydroxyalkyl or hydroxyalkenyl, still more preferably $C_8$-$C_{16}$ alkyl or hydroxyalkyl,
n is an integer of 1 to 100, preferably an integer of 1 to 50, more preferably an integer of 1 to 30,
each $X^+$ is H or a cation, for example, $NH_4$, an alkali metal such as sodium, potassium and calcium, an alkyl substituted ammonium such as ethylamine, propylamine and isopropylamine, or a hydroxyalkyl substituted ammonium such as alkanolamine;

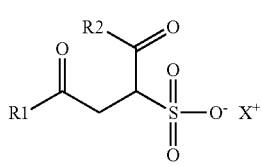
(II)

wherein
one of $R_1$ and $R_2$ is —$OR_5$,
the other of $R_1$ and $R_2$ is —$OX^+$, $R_5$ is $C_1$-$C_{22}$ alkyl, alkenyl, hydroxyalkyl, hydroxyalkenyl, amidoalkyl, or amido hydroxyalkyl, preferably $C_1$-$C_{16}$ alkyl, alkenyl, hydroxyalkyl, hydroxyalkenyl, amidoalkyl, or amido hydroxyalkyl, more preferably $C_4$-$C_{16}$ alkyl, alkenyl, hydroxyalkyl or hydroxyalkenyl, still more preferably $C_8$-$C_{16}$ alkyl or hydroxyalkyl,
each $X^+$ is H or a cation, for example, $NH_4$, an alkali metal such as sodium, potassium and calcium, an alkyl substituted ammonium such as ethylamine, propylamine and isopropylamine, or a hydroxyalkyl substituted ammonium such as alkanolamine; and
(c) an additional surfactant.

Pesticide

Suitable pesticides are biologically active compounds used to control agricultural pests and include, for example, herbicides, plant growth regulators, crop dessicants, fungicides, bacteriocides, bacteriostats, insecticides, and insect repellants. Suitable pesticides include, for example, triazine herbicides such as metribuzin, hexaxinone, or atrazine; sulfonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; phenoxyacetic acids such as 2,4-D; diphenyl ether herbicides such as fluazifop, acifluorfen, bifenox, or oxyfluorfen; dinitro aniline herbicides such as trifluralin; organophosphonate herbicides such as glyphosate salts and esters; dihalobenzonitrile herbicides such as bromoxynil, or ioxynil, dipyridilium herbicides such as paraquat. Suitable fungicides include, for example, nitrilo oxime fungicides such as cymoxanil; imidazole fungicides such as benomyl, carbendazim, or thiophanate-methyl; triazole fungicides such as triadimefon; sulfenamide fungicides, such as captan; dithio-carbamate fungicides such as maneb, mancozeb, or thiram; chloronated aromatic fungicides such as chloroneb; dichloro aniline fungicides such as iprodione, strobilurin fungicides such as kresoxim-methyl, trifloxystrobin or azoxystrobin; chlorothalonil; copper salt fungicides such as copper oxychloride; sulfur; phenylamides; and acylamino fungicides such as metalaxyl or mefenoxam. Suitable insecticides, include, for example, carbamate insecticides, such as methomyl, carbaryl, carbofuran, or aldicarb; organo thiophosphate insecticides such as EPN, isofenphos, isoxathion, chlorpyrifos, or chlormephos; organophosphate insecticides such as terbufos, monocrotophos, or terachlorvinphos; perchlorinated organic insecticides such as methoxychlor; synthetic pyrethroid insecticides such as fenvalerate, abamectin or emamectin benzoate, neonicotinoide insecticides such as thiamethoxam or imidacloprid; pyrethroid insecticides such as lambda-cyhalothrin, cypermethrin or bifenthrin, and oxadiazine insecticides such as indoxacarb, imidachlopryd, or fipronil. Suitable miticides include, for example, propynyl sulfite miticides such as propargite; triazapentadiene miticides such as amitraz; chlorinated aromatic miticides such as chlorobenzilate, ortetradifan; and dinitrophenol miticides such as binapacryl. Suitable nematicides include carbamate nematicides, such as oxamyl.

Pesticide compounds are, in general, referred herein to by the names assigned by the International Organization for Standardization (ISO). ISO common names may be cross-referenced to International Union of Pure and Applied Chemistry ("IUPAC") and Chemical Abstracts Service ("CAS") names through a number of sources such as, for example, the Compendium of Pesticide Common Names.

In some embodiments, the pesticide is one or more compounds selected from the group consisting of herbicides, plant growth regulators, crop dessicants, fungicides, bacteriocides, bacteriostats, insecticides, miticides, nematocides, and insect repellants.

In some embodiments, the pesticide is selected from glufosinate and the salt thereof, glyphosate and the salt thereof.

In the case that the pesticide is glyphosate or the salt thereof, the salt may be the potassium salt of glyphosate, the sodium salt of glyphosate, the isopropyl amine salt of glyphosate, the ammonium salt of glyphosate, combination of the potassium salt of glyphosate and the isopropyl amine salt of glyphosate, or combination of the potassium salt of glyphosate and the ammonium salt of glyphosate.

The glyphosate or the salt thereof may be present in an amount of from 5 wt % to 90 wt %, preferably from 20 wt % to 60 wt %, more preferably, 30% to 50%, based on total weight of the composition.

In a preferred embodiment of the present invention, the pesticide is a glufosinate or salt thereof which may be represented by the general formula (III)

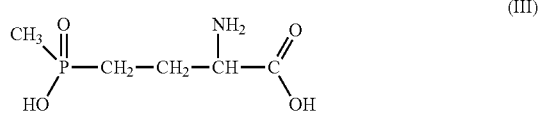

in the form of the racemate or of the L enantiomer, lower alkyl esters thereof or salts thereof with acids or bases.

The compounds of the general formula (III) include an asymmetric carbon atom. The L enantiomer is regarded as the biologically active isomer. The general formula (III) hence embraces all stereoisomers and mixtures thereof, particularly the racemate, and the biologically active enantiomer in each case. Examples of active ingredients of the formula (III) are as follows:

glufosinate and its ammonium salt in racemic form, i.e., 2-amino-4-[hydroxy(methyl)phosphinoyl]butanoic acid and its ammonium salt, the L enantiomer of glufosinate and its ammonium salt, bilanafos/bialaphos, i.e., L-2-amino-4-[hydroxy(methyl)phosphinoyl]butanoyl-L-alaninyl-L-alanine and its sodium salt.

Preferably, the pesticide is an ammonium salt of glufosinate.

In the case that the pesticide is a glufosinate or the salt thereof, the glufosinate active ingredient may be present in an amount of from 1 wt % to 90 wt %, preferably from 5 wt % to 35 wt %, more preferably from 10 wt % to 25 wt %, based on total weight of the composition.

Sulfosuccinate Surfactant

Advantageously, the sulfosuccinate surfactant component comprises at least a compound according to the general formula (IV) and a compound according to the general formula (II) as described above:

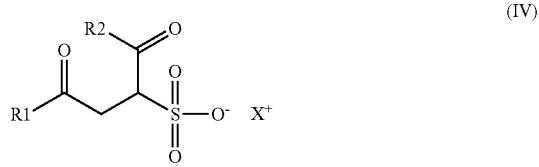

wherein:
one of $R_1$ and $R_2$ is

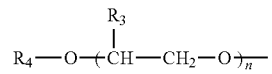

the other of $R_1$ and $R_2$ is $-OX^+$,
$R_3$ is H, $C_1$-$C_4$ alkyl, alkenyl, hydroxyalkyl or hydroxyalkenyl, such as methyl, ethyl, propyl, iso-propyl, butyl, and iso-butyl, preferably $R_3$ is H or methyl,
$R_4$ is $C_1$-$C_{22}$ alkyl, alkenyl, hydroxyalkyl or hydroxyalkenyl, preferably $C_1$-$C_{16}$ alkyl, alkenyl, hydroxyalkyl or hydroxyalkenyl, more preferably $C_4$-$C_{16}$ alkyl, alkenyl, hydroxyalkyl or hydroxyalkenyl, still more preferably $C_8$-$C_{16}$ alkyl or hydroxyalkyl,
n is an integer of 1 to 100, preferably an integer of 1 to 50, more preferably an integer of 1 to 30,
each $X^+$ is H or a cation, for example, $NH_4$, an alkali metal such as sodium, potassium and calcium, an alkyl substituted ammonium such as ethylamine, propylamine and isopropylamine, or a hydroxyalkyl substituted ammonium such as alkanolamine.

More advantageously, the sulfosuccinate surfactant component comprises at least a compound according to the general formula (V) and a compound according to the general formula (II) as described above:

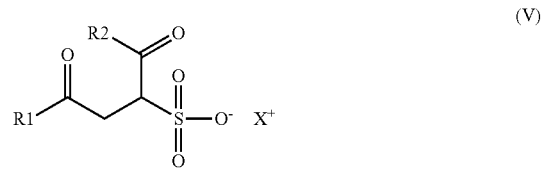

wherein:
one of $R_1$ and $R_2$ is

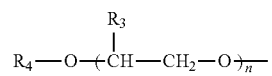

the other of $R_1$ and $R_2$ is $-OX^+$,
$R_3$ is H, $C_1$-$C_4$ alkyl, alkenyl, hydroxyalkyl or hydroxyalkenyl, such as methyl, ethyl, propyl, iso-propyl, butyl, and iso-butyl, preferably $R_3$ is H or methyl,
$R_4$ is $C_1$-$C_{22}$ alkyl, alkenyl, hydroxyalkyl or hydroxyalkenyl, preferably $C_1$-$C_{16}$ alkyl, alkenyl, hydroxyalkyl or hydroxyalkenyl, more preferably $C_4$-$C_{16}$ alkyl, alkenyl, hydroxyalkyl or hydroxyalkenyl, still more preferably $C_8$-$C_{16}$ alkyl or hydroxyalkyl, n is an integer of 1 to 30,
each $X^+$ is H or a cation, for example, $NH_4$, an alkali metal such as sodium, potassium and calcium, an alkyl substituted ammonium such as ethylamine, propylamine and isopropylamine, or a hydroxyalkyl substituted ammonium such as alkanolamine.

Examples of the sulfosuccinate compound according to the general formula (I) include and are not limited to: disodium decyl-PEG-4 sulfosuccinate, disodium cocamide MIPA sulfosuccinate, disodium oleamido MIPA sulfosuccinate, disodium oleylamido PEG-2 sulfosuccinate, disodium cocamido MEA sulfosuccinate, diammonium lauramido MEA sulfosuccinate, disodium laureth sulfosuccinate, disodium laureth-5 sulfosuccinate.

Examples of the sulfosuccinate compound according to the general formula (II) include and are not limited to: disodium monooctylsulfosuccinate, disodium lauryl sulfosuccinate, disodium isodecyl sulfosuccinate, disodium tridecyl sulfosuccinate, diammonium lauryl sulfosuccinate.

Additional Surfactant

The additional surfactant may be one or more compounds selected from cationic surfactants, and/or nonionic surfactants, and/or anionic surfactants, and/or amphoteric surfactants, preferably, the additional surfactant is selected from cationic surfactants and/or amphoteric surfactants.

Amphoteric Surfactants

The term "amphoteric surfactant" (or zwitterionic surfactant) is well-known to a person skilled in the art. It refers to surfactants which, depending on the pH, have anionic and/or cationic properties. They also have an isoelectric point at which they possess a zwitterionic character. In particular, the term refers to compounds having an $N^+$ function in combination with an $C(O)OH$, $C(O)O^-$, $SO_3H$ or $SO_3^-$ function and to compounds having an N function in combination with a $C(O)OH$, $C(O)O^-$, $SO_3H$ or $SO_3^-$ function. More in particular, it refers to compounds having a quaternary $N^+$ function in combination with a $C(O)O^-$, $SO_3H$ or $SO_3^-$ function, and to compounds having a tertiary N function in combination with a $C(O)OH$, $C(O)O^-$, $SO_3H$ or $SO_3^-$ function.

In particular, the amphoteric surfactant is selected from the group consisting of:
  betaine, amidobetaine, sulfobetaine, amidosulfobetaine, amphoacetate, amphodiacetate, amphopropionate, amphodipropionate, iminopropionate, iminodipropionate, aminopropionate and a mixture thereof.

Betaines are generally known compounds. Betaine may be compounds according to the general formula (VII):

$$R_6R_7R_8N^+(CH_2)_xC(O)O^- \quad (VII)$$

wherein $R_6$ is a $C_1$-$C_4$ alkyl or hydroxyalkyl, such as a methyl, ethyl, propyl, hydroxyethyl and hydroxypropyl,
$R_7$ is $C_6$-$C_{22}$ alkyl, alkenyl, hydroxyalkyl or hydroxyalkenyl,
$R_8$ is a $C_1$-$C_4$ alkyl or hydroxyalkyl, or a $C_6$-$C_{22}$ alkyl, alkenyl, hydroxyalkyl or hydroxyalkenyl,
x is an integer of 2-4,
wherein any two of the groups $R_6$-$R_8$ may optionally form a ring structure.

In one preferred embodiment, $R_6$ and $R_8$ as defined in the general formula (VII) is independently $C_1$-$C_4$ alkyl, in particular methyl, x=1, and $R_7$ is $C_6$-$C_{22}$alkyl, alkenyl, hydroxyalkyl or hydroxyalkenyl, in particular $C_8$-$C_{16}$ alkyl, alkenyl, hydroxyalkyl or hydroxyalkenyl.

Amidobetaines are generally known compounds. Amidobetaine may be compounds according to the general formula (VIII):

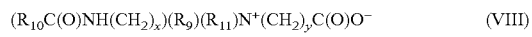
$$(R_{10}C(O)NH(CH_2)_x)(R_9)(R_{11})N^+(CH_2)_yC(O)O^- \quad (VIII)$$

wherein $R_9$ is a $C_1$-$C_4$ alkyl or hydroxyalkyl, such as a methyl, ethyl, hydroxyethyl and hydroxypropyl group,
$R_{10}$ is $C_5$-$C_{21}$ alkyl, alkenyl, hydroxyalkyl or hydroxyalkenyl,
$R_8$ is a $C_1$-$C_4$ alkyl or hydroxyalkyl, or a $C_5$-$C_{21}$ alkyl, alkenyl, hydroxyalkyl or hydroxyalkenyl,
x is an integer of 2-4,
y is an integer of 2-4,
wherein any two of the groups $R_9$-$R_{11}$ may optionally form a ring structure.

Suitable betaines and amidobetaines may be those in which the alkyl moieties are derived from soybean oil, coconut oil, tallow or hydrogenated tallow. Examples of betaines and amidobetaines include and are not limited to: decyl dimethyl betaine, coco dimethyl betaine, myristyl dimethyl betaine, palmityl dimethyl betaine, lauryl dimethyl betaine, cetyl dimethyl betaine, stearyl dimethyl betaine, dimethylcoco amidobetaine, dimethyloleyl amidobetaine, dimethyl-tallow amidobetaine, oleic amidopropyl betaine, erucic amidopropyl betaine.

Sulfobetaines are generally known compounds. Sulfobetaine may be compounds according to the general formula (IX):

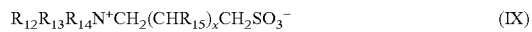
$$R_{12}R_{13}R_{14}N^+CH_2(CHR_{15})_xCH_2SO_3^- \quad (IX)$$

wherein $R_{12}$ is a $C_1$-$C_4$ alkyl or hydroxyalkyl, such as a methyl, ethyl, propyl, hydroxyethyl and hydroxypropyl,
$R_{12}$ is $C_6$-$C_{22}$ alkyl, alkenyl, hydroxyalkyl or hydroxyalkenyl,
$R_{14}$ is a $C_1$-$C_4$ alkyl or hydroxyalkyl, or a $C_6$-$C_{22}$ alkyl, alkenyl, hydroxyalkyl or hydroxyalkenyl,
$R_{15}$ is H or OH,
x is an integer of 0-2,
wherein any two of the groups $R_{12}$-$R_{14}$ may optionally form a ring structure.

Amidosulfobetaine are generally known compounds. Amidosulfobetaine may be compounds according to the general formula (X):

$$(R_{16}C(O)NH(CH_2)_x)(R_{17})(R_{18})N^+CH_2(CHR_{19})_yCH_2SO_3^- \quad (X)$$

wherein
$R_{16}$ is $C_5$-$C_{21}$ alkyl, alkenyl, hydroxyalkyl or hydroxyalkenyl,
$R_{17}$ is a $C_1$-$C_4$ alkyl or hydroxyalkyl, such as a methyl, ethyl, propyl, hydroxyethyl and hydroxypropyl,
$R_{18}$ is a $C_1$-$C_4$ alkyl or hydroxyalkyl, or a $C_5$-$C_{21}$ alkyl, alkenyl, hydroxyalkyl or hydroxyalkenyl,
$R_{19}$ is H or OH,
x is an integer of 2-4,
y is an integer of 0-2,
wherein any two of the groups $R_{16}$-$R_{18}$ may optionally form a ring structure.

Examples of sulfobetaine and amidosulfobetaine include and are not limited to: coco dimethyl sulfobetaine, myristyl dimethyl sulfobetaine, palmityl dimethyl sulfobetaine, lauryl dimethyl sulfobetaine, erucamidopropyl hydroxypropyl sulfobetaine, cocoamido ethylbetaine, cocoamidoethylsulfobetaine, erucamidopropyl hydroxyethyl sulfobetaine, erucamidopropyl hydroxymethyl sulfobetaine.

Iminopropionate may be compounds according to the general formula (XI):

$$R_{20}-N-(CH_2CH_2COOY)_2 \quad (XI)$$

wherein $R_{20}$ is a $C_6$-$C_{22}$ alkyl, alkenyl, hydroxyalkyl or hydroxyalkenyl,
Y is a cation.

Aminopropionates may be compounds according to the general formula (XII):

$$R_{21}R_{22}N-(CH_2CH_2COOY) \quad (XII)$$

wherein each $R_{21}$ and $R_{22}$ is independently a H, $C_6$-$C_{22}$ alkyl, alkenyl, hydroxyalkyl or hydroxyalkenyl,
Y is a cation.

Examples of iminopropionate and aminopropionate include and are not limited to: N-coco-beta-aminopropi onate, N-tallow-beta-aminopropionate, N-coco-beta-iminopropionate, N-tallow-beta-iminopropionate.

Examples of iminodipropionate include sodium cociminodipropionate and sodium 2-ethylhexyliminodipropionate.

Amphoacetates, amphodiacetates, amphopropionates and amphodipropionates are known compounds. Examples of such compounds include and are not limited to: cocoamphoacetate, lauroamphoacetate, caproam phoacetate, caprylamphoacetate, stearoam phoacetate, isostearoamphoacetate, myristoamphoacetate, cocoamphodiacetate, lauroamphodiacetate, caproamphodiacetate, caprylamphodiacetate, stearoamphodiacetate, isostearoamphodiacetate, myristoamphodiacetate, cocoamphopropionate, lauroamphopropionate, caproamphopropionate, caprylamphopropionate, stearoamphopropionate, isostearoamphopropionate, myristoamphopropionate, cocoamphodipropionate, lauroamphodipropionate, caproamphodipropionate, caprylamphodipropionate, stearoamphodipropionate, isostearoamphodipropionate, myristoamphodipropionate.

Specific examples of the amphoteric surfactant include: GERONOL® CF/AS30HL ($C_{12-14}$ alkyldimethyl betaine), MACKAM® LHS (dodecyl sulfonate betaine), MIRATAINE® H2C-HA (disodium lauriminodipropionate), MACKAM® DP-122 (cocimino dipropionate), MIRANOL® C2M-SF Conc (disodium cocoamphodipropionate), MACKAM® OIP-40 (sodium 2-ethylhexyliminodipropionate), MIRATAINE® CBS 35 (cocoamidopropyl sulfonate betaine), MIRANOL® ULTRA L-32 (sodium lauroamphoacetate), MIRATAINE® CAB (cocoamidopropyl betaine), MIRATAINE® ASC (alkylether hydroxypropyl sultaine), all from Solvay.

Cationic Surfactants

Suitable cationic surfactants include primary, secondary and tertiary alkylamines, primary, secondary and tertiary alkylaminium salts in which an amine group is substantially protonated in the formulation, onium salts such as quaternary alkylammonium salts, and mixtures thereof. Suitable anions for the cationic surfactants of the present invention include chloride anion, hydroxide anion, glyphosate anion, sulfate anion and phosphate anion.

The primary, secondary and tertiary alkylamine surfactants for use in the present invention are tertiary polyoxyalkylene alkylamines and alkyletheramines.

Preferably, the cationic surfactants are quaternary alkylammonium salts, including, for example, alkyl lower-alkyl di(hydroxy-lower-alkyl) ammonium chlorides; dialkyl di(lower-alkyl) ammonium chlorides; alkyl tri(lower-alkyl) ammonium chlorides; carboxymethylated imidazolines. Particularly preferred are dialkyl dimethyl ammonium chlorides and alkyl trimethyl ammonium chlorides, such as FENTACARE®1231 from Solvay.

Nonionic Surfactants

Examples of nonionic surfactants suitable for the present invention are:
1) fatty alcohols having 10-24 carbon atoms with 0-60 EO and/or 0-20 PO and/or 0-15 BO in any order, polyalkylphenol polyethoxy ethers, polyglycol ether derivatives of aliphatic alcohols, polyglycol ether derivatives of cycloaliphatic alcohols;
2) fatty acid alkoxylates and triglyceride alkoxylates, fatty acid alkoxylates and triglyceride alkoxylates, such as polyglycol ether derivatives of fatty acids, polyalkoxylated fatty glyceride;
3) fatty acid amide alkoxylates;
4) alkylene oxide adducts of alkynediols, sugar derivatives such as amino sugars and amido sugars;
5) alkyl glycosides and alkyl polyglycosides, $C_8$-$C_{22}$ alkyl or alkenyl polyglycosides;
6) sorbitan ester, fatty acid esters of polyoxyethylene sorbitan, fatty acid alkoxylates such as sorbitan alkoxylates, sorbitol ester alkoxylates;
7) cyclodextrin esters or ethers;
8) surface-active cellulose derivatives and algine, pectin and guar derivatives such as the Tylose® grades from Clariant, the Manutex® grades from Kelco, and guar derivatives from Cesalpina;
9) polyol-based alkylene oxide adducts such as Polyglykol® grades from Clariant;
10) surface-active polyglycerides and their derivatives;
11) alkoxylated alkylphenol;
12) alkanolamide;
13) alkoxylated fatty amine;
14) alkoxylated vegetable oils such as alkoxylated castor oil.

Specific examples of suitable nonionic surfactants include: IGEPAL® BC/9 (ethoxylated alkylphenol, from Solvay), RHODAMEEN® T15 (ethoxylated fatty amine, from Solvay), ALKAMULS® T/20 (sorbitan ester, from Solvay), ALKAMULS® OR/36 (ethoxylated castor oil, from Solvay).

Preferably, the nonionic surfactant is selected from the group consisting of: alkoxylated alcohol, alkoxylated vegetable oil, alkoxylated fatty amine, alkoxylated alkylphenol, sorbitan ester and a mixture thereof.

Anionic Surfactants

Suitable anionic surfactants include alcohol sulfates, alcohol ether sulfates, alkylaryl ether sulfates, alkylaryl sulfonates such as alkylbenzene sulfonates and alkylnaphthalene sulfonates and salts thereof, alkyl sulfonates, mono- or di-phosphate esters of polyalkoxylated alkyl alcohols or alkylphenols, alcohol ether carboxylates, phenolic ether carboxylates, polybasic acid esters of ethoxylated polyoxyalkylene glycols consisting of oxybutylene or the residue of tetrahydrofuran, sulfoalkylamides and salts thereof such as N-methyl-M-oleoyltaurate Na salt, polyoxyalkylene alkylphenol carboxylates, polyoxyalkylene alcohol carboxylates alkyl polyglycoside/alkenyl succinic anhydride condensation products, alkyl ester sulfates, napthalene sulfonates, naphthalene formaldehyde condensates, alkyl sulfonamides, sulfonated aliphatic polyesters, sulfate esters of styrylphenyl alkoxylates, and sulfonate esters of styrylphenyl alkoxylates and their corresponding sodium, potassium, calcium, magnesium, zinc, ammonium, alkylammonium, diethanolammonium, or triethanolammonium salts, salts of ligninsulfonic acid such as the sodium, potassium, magnesium, calcium or ammonium salt, olefin sulfonate, polyarylphenol polyalkoxyether sulfates and polyarylphenol polyalkoxyether phosphates, and sulfated alkyl phenol ethoxylates and phosphated alkyl phenol ethoxylates.

Specific examples of suitable anionic surfactants include: RHODAFAC® PS/19 (ethoxylated alkylphenol phosphate, potassium; from Solvay), Stepfac 8171 (ethoxylated nonylphenol phosphate ester; from Stepan); Emphos CS-131 (ethoxylated nonylphenol phosphate ester; from Witco); and Atphos 3226 (ethoxylated tridecylalcohol phosphate ester; from Uniqema).

Preferably, the anionic surfactant is selected from the group consisting of alkoxylated alkylphenol phosphate, mono- or di-phosphate esters of alkoxylated alkyl alcohols or alkylphenols, polyarylphenol polyalkoxyether phosphates, phosphated alkyl phenol ethoxylates, olefin sulfonate and a mixture thereof.

In a preferred embodiment of the present invention, the pesticidal composition comprises:
(a) an effective amount of a pesticide;
(b) the sulfosuccinate surfactant component as described herein; and
(c) an additional surfactant;
wherein the additional surfactant is one or more compounds selected from:
  a cationic surfactant, preferably quaternary alkylammonium salt; or
  an amphoteric surfactant, preferably betaine, amidobetaine, sulfobetaine and amido sulfobetaine; or
  a nonionic surfactant selected from the group consisting of alkoxylated alcohol, alkoxylated vegetable oil, alkoxylated fatty amine, alkoxylated alkylphenol, sorbitan ester and a mixture thereof; or
  an anionic surfactant selected from the group consisting of alkoxylated alkylphenol phosphate, mono- or di-phosphate esters of alkoxylated alkyl alcohols or alkylphenols, polyarylphenol polyalkoxyether phosphates, phosphated alkyl phenol ethoxylates, olefin sulfonate and a mixture thereof.

The sulfosuccinate surfactant component may be present in an amount of from 0.01 wt % to 30 wt %, preferably from 0.1 wt % to 25 wt %, more preferably from 1 to 15 wt %, based on total weight of the composition.

The additional surfactant component may be present in an amount of from 0.01 wt % to 30 wt %, preferably from 0.1 wt % to 25 wt %, more preferably from 1 to 15 wt %, based on total weight of the composition.

The weight ratio between the sulfosuccinate surfactant component and the additional surfactant component may be from 10/90 to 90/10, preferably from 30/70 to 70/30.

According to the present invention, the pesticidal composition may be a liquid composition or may be in solid form. Preferably the composition is a liquid composition, more preferably an aqueous composition. The composition, for example, may be an aqueous solution or an aqueous dispersion, in particular a single phase solution. The composition may also be a suspension concentrate in which some insoluble components are present in the solid phase, and the pesticide active ingredient and the surfactants according to the invention are in the aqueous liquid phase. The composition may also be an emulsion, for example, components of low melting point or liquid components are prepared with the pesticide active ingredient and the surfactants in the form of a stable emulsion in which the pesticide active ingredient and the surfactants are present in the aqueous phase and the water-insoluble liquid or some components, dissolved in organic solvents, is present in the "oily" liquid phase, where the organic solvents themselves should not be water-soluble. The compositions may include both dilute compositions, which are ready for immediate use, and concentrated compositions, which require to be diluted before use, usually with water.

Accordingly, the present invention relates to a liquid pesticidal composition, notably a liquid herbicidal composition, comprising:
(a) an effective amount of a pesticide,
(b) a sulfosuccinate surfactant component as described herein,
(c) an additional surfactant, and
(d) a liquid carrier.

The liquid carrier may notably be water. The liquid carrier may optionally comprise one or more organic solvents as well. Examples of suitable organic solvents are aliphatic alcohols, such as lower alkanols such as methanol, ethanol, propanol, isopropanol and butanol, or polyhydric alcohols such as ethylene glycol and glycerol, for example, polar ethers such as tetrahydrofuran (THF), dioxane, alkylene glycol monoalkyl and dialkyl ethers, such as propylene glycol monomethyl ether, propylene glycol monoethyl ether, ethylene glycol monomethyl or monoethyl ether, diglyme and tetraglyme, for example; amides such as dimethylformamide (DMF), dimethylacetamide, dimethylcaprylamide, dimethylcapramide (®Hallcomide) and N-alkylpyrrolidones; ketones such as acetone; esters based on glycerol and carboxylic acids, such as glyceryl mono-, di- and triacetate, lactams; carbonic diesters; nitriles such as acetonitrile, propionitrile, butyronitrile and benzonitrile; sulfoxides and sulfones such as dimethyl sulfoxide (DMSO) and sulfolane.

Also suitable in many cases are combinations of different solvents which additionally include alcohols such as methanol, ethanol, n- and isopropanol, n-, iso-, tert- and 2-butanol.

In the case of single-phase aqueous-organic solutions the wholly or largely water-miscible solvents or solvent mixtures are appropriate.

Preferred organic solvents are polar organic solvents such as N-methylpyrrolidone and Dowanol® PM (propylene glycol monomethyl ether).

Preferably, the herbicidal composition should contain no, or the smallest possible amounts, of organic solvents due to the flammability and potential hazard for the user. Preferably, the composition of the present invention is substantially free or completely free of any organic solvent. In the context of the present application, "substantially free" when used with reference to the absence of organic solvent in the composition, means that the composition comprises less than 1 wt % of organic solvent, more preferably less than 0.5 wt % of organic solvent, based on the total weight of the composition. As used herein, the term "completely free" when used with reference to the absence of organic solvent in the composition, means that the composition comprises no organic solvent at all.

In the case that the composition is a liquid glufosinate composition, the glufosinate active ingredient may be present in an amount of from 5 wt % to 35 wt %, preferably from 5 wt % to 30 wt %, more preferably from 5 wt % to 25 wt %, still more preferably from 10 wt % to 20 wt %, based on total weight of the liquid composition.

Other Ingredients

The composition may further comprise other agronomically suitable excipients such as auxiliary adjuvants for example ammonium sulfate, other surfactants, solvents, pH modifiers, crystallization inhibitors, viscosity modifiers, suspending agents, spray droplet modifiers, pigments, antioxidants, light-blocking agents, compatibilizing agents, antifoam agents, sequestering agents, neutralizing agents, corrosion inhibitors, dyes, odorants, spreading agents, penetration aids, emolients, lubricants, sticking agents, dispersing agents, thickening agents, freezing point depressants, antimicrobial agents, plant growth regulators, crop dessicants, fungicides, bacteriocides, bacteriostats, insecticides, miticides, nematocides, and insect repellants.

In the case of the aqueous compositions, it is advantageous to add defoamers. Suitable defoamers include all customary defoamers, preferably silicone-based defoamers, such as silicone oils, for example.

Preferred defoamers are those from the group of linear polydimethylsiloxanes having an average dynamic viscosity, measured at 25° C., in the range from 1000 to 8000 mPas, preferably 1200 to 6000 mPas, and containing silica. Silica comprehends forms/modifications such as polysilicic acids, meta-silicic acid, ortho-silicic acid, silica gel, silicic acid gels, kieselguhr, precipitated $SiO_2$, etc.

Defoamers from the group of linear polydimethylsiloxanes contain as their chemical backbone a compound of the formula HO—[$S_i(CH_3)_2$—O—]$_n$—H, in which the end groups are modified, by etherification for example, or, in general, are attached to the groups —$S_i(CH_3)_3$.

The amount of silica can be modified within a wide range and is generally situated in the range from 0.1 to 10 percent by weight, preferably 0.2 to 5 percent by weight, in particular 0.2% to 2% by weight, of silica, based on the weight of polydimethylsiloxane. Examples of defoamers of this kind are Rhodorsil® Antifoam 416 and Rhodorsil® Antifoam 481 (Solvay).

Further defoamers from the silicone group are Rhodorsil® 1824 (Solvay), Antimussol 4459-2 (Clariant), Defoamer V 4459 (Clariant), SE Visk and AS EM SE 39 (Wacker). The silicone oils can also be used in the form of emulsions.

The composition may further comprise inorganic salts. For example, an inorganic ammonium salt such as ammonium sulfate can be included.

Illustrative inorganic salts that can be present are ammonium carbonate, ammonium bicarbonate, ammonium chloride, ammonium fluoride, ammonium nitrate, ammonium biphosphate, ammonium dihydrogen phosphate, ammonium sulfate, ammonium bisulfate, ammonium bisulfite, ammonium thiocyanate, potassium carbonate, potassium bicarbonate, potassium chloride, potassium nitrate, potassium phosphate, potassium biphosphate, potassium dihydrogen phosphate, potassium sulfate, potassium bisulfate, potassium sulfite, potassium bisulfite, sodium carbonate, sodium bicarbonate, sodium chloride, sodium nitrate, sodium phosphate, sodium biphosphate, sodium dihydrogen phosphate, sodium sulfate, sodium bisulfate, sodium sulfite and sodium bisulfite.

The composition may further comprise one or more thickeners, including any viscosity increasing or thixotropic agent known in the art. Certain surfactants, including representatives of nonionic and anionic surfactant classes identified above, can act as thickeners. Inert solid particulates useful as thickeners include microparticulate and nanoparticulate silica, titanium dioxide, aluminum oxide, attapulgites, montmorillonites, bentonites and diatomites. Gums useful as thickeners include xanthan, gellan and guar gums. Polymers useful as thickeners include polyethylene and polypropylene glycols, polyacrylates, polyacrylamides, polyethyleneimines, polyvinyl alcohol, polyvinyl acetate, methyl-, hydroxyethyl- and hydroxypropylcelluloses and derivatives thereof, starches and derivatives thereof, etc.

Preferred thickeners where included are colloidal microparticulate silica and clays, such as colloidal attapulgite. Clays that have a tendency to bind the foliar-active herbicide or otherwise render it insoluble in water or unavailable for foliar uptake should be used sparingly in the composition, to avoid loss of foliar herbicidal activity.

Further adjuvants such as ammonium sulphate, urea or humectants, such as lactate salts can also be included.

The liquid composition according to the present invention may be prepared by methods which are customary in principle, i.e. by mixing the components with stirring or shaking or by means of static mixing methods. The liquid composition obtained is stable with good storage properties under a wide range of temperatures. Alternatively, the adjuvants in the composition, such as the sulfosuccinate surfactants, the additional surfactants and optionally other ingredients, may be mixed and prepared as a tank mix of adjuvant formulation, which can be readily mixed with the pesticide actives before application. The tank mix adjuvant formulation can also be applied to plants simultaneously with the pesticide actives.

The pesticidal composition of the present invention may also be in the form of wettable powders, emulsifiable concentrates, dusting agents and granules.

Wettable powders are preparations which are uniformly dispersible in water and which, besides the active substance, also contain wetting agents, for example polyoxethylated alkylphenols, polyoxethylated fatty alcohols or fatty amines, fatty alcohol polyglycol ether sulfates, alkanesulfonates or alkylbenzenesulfonates, and dispersing agents, for example sodium lignin-sulfonate, sodium 2,2'-dinaphthylmethane-6,6'-disulfonate, sodium dibutylnaphthalenesulfonate, or alternatively sodium oleylmethyltaurinate, in addition to a liquid carrier or inert substance.

Emulsifiable concentrates may be prepared by dissolving the active substance in an organic solvent, for example butanol, cyclohexanone, dimethylformamide, xylene or else higher-boiling aromatic compounds or hydrocarbons, with the addition of one or more emulsifiers. Examples of emulsifiers which can be used are: calcium salts of an alkylarylsulfonic acid, such as Ca dodecylbenzene-sulfonate, or non-ionic emulsifiers, such as fatty acid polyglycol esters, alkylaryl polyglycol ethers, fatty alcohol polyglycol ethers, propylene oxide/ethylene oxide condensation products, alkyl polyethers, sorbitan fatty acid esters, polyoxyethylene sorbitan fatty acid esters or polyoxyethylene sorbitol esters.

Dusting agents can be obtained by grinding the active substance with finely divided solid substances, for example talc or natural clays, such as kaolin, bentonite, pyrophyllite or diatomaceous earth.

Granules can be produced either by spraying the active substance onto adsorptive, granulated inert material or by applying active substance concentrates onto the surface of carriers, such as sand, kaolinites or granulated inert material, by means of binders, for example polyvinyl alcohol, sodium polyacrylate or, alternatively, mineral oils.

The pesticidal composition according to the present invention is especially suitable for use in crop protection wherein the composition is applied to the plants, to parts of the plants or to the area under cultivation.

In one aspect of the present invention, there is provided a method for controlling undesired plants, such as weeds, which comprises applying the composition described herein to the plants.

The composition may be used to control a very wide variety of plants worldwide.

Particularly important annual dicotyledonous plant species for control of which the composition of the invention can be used are exemplified without limitation by velvetleaf (*Abutilon theophrasti*), pigweed (*Amaranthus* spp.), buttonweed (*Borreria* spp.), oilseed rape, canola, indian mustard, etc. (*Brassica* spp.), commelina (*Commelina* spp.), filaree (*Erodium* spp.), sunflower (*Helianthus* spp.), morningglory (*Ipomoea* spp.), kochia (*Kochia scoparia*), mallow (*Malva* spp.), wild buckwheat, smartweed, etc. (*Polygonum* spp.), purslane (*Portulaca* spp.), russian thistle (*Salsola* spp.), sida (*Sida* spp.), wild mustard (*Sinapis arvensis*) and cocklebur (*Xanthium* spp.).

Particularly important annual monocotyledonous plant species for control of which the composition of the invention can be used are exemplified without limitation by wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine* indica), annual ryegrass (*Lolium multiflorum*), rice (*Oryza sativa*), ottochloa (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*).

Particularly important perennial dicotyledonous plant species for control of which the composition of the invention can be used are exemplified without limitation by mugwort (*Artemisia* spp.), milkweed (*Asclepias* spp.), canada thistle (*Cirsium arvense*), field bindweed (*Convolvulus arvensis*) and kudzu (*Pueraria* spp.).

Particularly important perennial monocotyledonous plant species for control of which the composition of the invention can be used are exemplified without limitation by brachiaria (*Brachiaria* spp.), bermudagrass (*Cynodon dactylon*), yellow nutsedge (*Cyperus esculentus*), purple nutsedge (*C. rotundus*), quackgrass (*Elymus repens*), lalang (*Imperata cylindrica*), perennial ryegrass (*Lolium perenne*), guineagrass (*Panicum maximum*), dallisgrass (*Paspalum dilatatumn*), reed (*Phragmites* spp.), johnsongrass (*Sorghum halepense*) and cattail (*Typha* spp.).

Other particularly important perennial plant species for control of which the composition of the invention can be used are exemplified without limitation by horsetail (*Equisetum* spp.), bracken (*Pteridium aquilinum*), blackberry (*Rubus* spp.) and gorse (*Ulex europaeus*).

The pesticidal composition of the present invention is preferably dilute enough to be readily sprayed using standard agricultural spray equipment. Application of the composition to foliage may be accomplished by spraying, using any conventional means for spraying liquids, such as spray nozzles, atomizers or the like. The composition of the invention can be used in precision farming techniques, in which apparatus is employed to vary the amount of pesticide applied to different parts of a field, depending on variables such as the particular plant species present, soil composition, etc. In one embodiment of such techniques, a global positioning system operated with the spraying apparatus can be used to apply the desired amount of the composition to different parts of a field. The selection of application rates that are effective for a composition of the invention is within the skill of the ordinary agricultural scientist.

Should the disclosure of any patents, patent applications, and publications which are incorporated herein by reference conflict with the description of the present application to the extent that it may render a term unclear, the present description shall take precedence.

Examples

Materials
GLUFOSINATE: glufosinate ammonium powder, 2-amino-4-(hydroxymethylphosphinyl)butanoic acid monoammonium salt; sulfosuccinate surfactants
SULFOSUCCINATE 1: a blend of alkylsulfosuccinic acid monoester and fatty alcohol polyglycol ether sulfosuccinic acid monoester containing about 1-30 EO, solid content 50 wt %;
SULFOSUCCINATE 2: disodium lauryl sulfosuccinate monoester, solid content 40 wt %;
SULFOSUCCINATE 3: disodium ethoxylated alcohol monoester of sulfosuccinic acid, containing about 1-10 EO, solid content 31 wt %;
GEROPON® CYA/75: dioctyl sulfosuccinate ester, solid content 75 wt %, from Solvay;
amphoteric surfactants GERONOL® CF/AS30HL: $C_{12-14}$ alkyldimethyl betaine, solid content 39 wt %, from Solvay;
MACKAM® LHS: dodecyl sulfonate betaine, solid content 30 wt %, from Solvay;
MIRATAINE® H2C-HA: disodium lauriminodipropionate, solid content 30 wt %, from Solvay;
MACKAM® DP-122: cocimino dipropionate, solid content 30 wt %, from Solvay;
MIRANOL® $C_2$M-SF Conc: disodium cocoamphodipropionate, solid content 39 wt %, from Solvay;
MACKAM® OIP-40: sodium 2-ethylhexyliminodipropionate, solid content 49 wt %, from Solvay;
MIRATAINE® CBS 35: cocoamidopropyl sulfonate betaine, solid content 35 wt %, from Solvay;
MIRANOL® ULTRA L-32: sodium lauroamphoacetate, solid content 38 wt %, from Solvay;
MIRATAINE® ASC: alkylether hydroxypropyl sultaine, solid content 50 wt %, from Solvay;
MIRATAINE® CAB: cocoamidopropyl betaine, solid content 35 wt %, from Solvay;
cationic surfactants
FENTACARE® 1231: dodecyl trimethyl ammonium chloride, solid content 37 wt %, from Solvay;
nonionic surfactants
GERONOL® CF/K: alkyl dimethyl amine oxide, solid content 30 wt %, from Solvay;
RHODASURF® LA7: alcohol ethoxylate, 100 wt %, from Solvay;
ALKAMULS® OR/36: ethoxylated castor oil, 100 wt %, from Solvay;
RHODAMEEN® T15: ethoxylated fatty amines, 100 wt %, from Solvay;
IGEPAL® BC/9: ethoxylated alkylphenol, 100 wt %, from Solvay;
ALKAMULS® T/20: ethoxylated sorbitan monolaurate, 100 wt %, from Solvay;
FENTACARE® OA-CAPO: 3-(N,N-Dimethylamino) propyl cocoamido amine oxide, solid content 30%, from Solvay;
anionic surfactants
RHODAFAC® PS/19: ethoxylated alkylphenol phosphate, potassium, from Solvay;
AOS: sodium alpha olefin sulfonate;
GERONOL® N70K: sodium lauryl ether sulfate, solid content 70 wt %, from Solvay.

Example 1—Stability Tests

Glufosinate compositions were prepared according to the formulations in upper panel of Tables 1-5 below ("S" means Sample, "CS" means Comparative Sample). Briefly, a glufosinate ammonium salt base solution (50 wt %) was firstly prepared and the pH was adjusted to be in the range of 5-7. Then, the base solution was mixed with surfactants and water to obtain the final compositions. Stability of the compositions were tested under 54° C., 20° C., 0° C. and −10° C., respectively. The appearance of the compositions was observed after two weeks (for 54° C. and 20° C.) or one week (for 0° C. and −10° C.). Results are shown in lower panel of Tables 1-5.

TABLE 1

|  | S1 | S2 | S3 | S4 |
|---|---|---|---|---|
| FORMULATION (wt %) | | | | |
| GLUFOSINATE (50%) | 37.0 | 37.0 | 37.0 | 37.0 |
| SULFOSUCCINATE 1 | 10.0 | 10.0 | 10.0 | 10.0 |
| GERONOL ® CF/AS30HL | 12.9 | — | — | — |
| MACKAM ® LHS | — | 20.0 | — | — |
| MIRATAINE ® H2C-HA | — | — | 20.0 | — |
| MACKAM ® DP-122 | — | — | — | 20.0 |
| WATER | balance | balance | balance | balance |
| TOTAL | 100 | 100 | 100 | 100 |
| TOTAL SURFACTANT | 10.0 | 11.0 | 11.0 | 11.0 |
| STABILITY | | | | |
| 54° C. | stable | stable | stable | stable |
| 20° C. | stable | stable | stable | stable |
| 0° C. | stable | stable | stable | stable |
| −10° C. | stable | stable | stable | stable |

TABLE 2

|  | S5 | S6 | S7 | S8 |
|---|---|---|---|---|
| FORMULATION (wt %) | | | | |
| GLUFOSINATE (50%) | 37.0 | 37.0 | 37.0 | 37.0 |
| SULFOSUCCINATE 1 | 10.0 | 10.0 | 10.0 | 10.0 |
| MIRANOL ® C2M-SF CONC | — | — | 20.0 | — |
| MACKAM ® OIP-40 | — | — | — | 20.0 |
| MIRATAINE ® CBS 35 | 20.0 | — | — | — |
| MIRANOL ® ULTRA L-32 | — | 20.0 | — | — |
| WATER | balance | balance | balance | balance |
| TOTAL | 100 | 100 | 100 | 100 |
| TOTAL SURFACTANT | 12.0 | 12.6 | 12.8 | 14.8 |
| STABILITY | | | | |
| 54° C. | stable | stable | stable | stable |
| 20° C. | stable | stable | stable | stable |
| 0° C. | stable | stable | stable | stable |
| −10° C. | stable | stable | stable | stable |

TABLE 3

|  | S9 | S10 | S11 | S12 |
|---|---|---|---|---|
| FORMULATION (wt %) | | | | |
| GLUFOSINATE (50%) | 37.0 | 37.0 | 37.0 | 37.0 |
| SULFOSUCCINATE 1 | 6.0 | 5.0 | 10.0 | 10.0 |
| FENTACARE ® 1231 | 19.0 | 16.3 | — | — |
| GERONOL ® CF/K | — | 5 | — | — |
| ALKAMULS ® OR/36 | — | — | 5.0 | — |
| RHODAMEEN ® T15 | — | — | — | 5.0 |
| WATER | balance | balance | balance | balance |
| TOTAL | 100 | 100 | 100 | 100 |
| TOTAL SURFACTANT | 10.0 | 10.0 | 10.0 | 10.0 |
| STABILITY | | | | |
| 54° C. | stable | stable | stable | stable |
| 20° C. | stable | stable | stable | stable |
| 0° C. | stable | stable | stable | stable |
| −10° C. | stable | stable | stable | stable |

TABLE 4

|  | S9 | S10 | S11 | S12 |
|---|---|---|---|---|
| FORMULATION (wt %) | | | | |
| GLUFOSINATE (50%) | 37.0 | 37.0 | 37.0 | 37.0 |
| SULFOSUCCINATE 1 | 10.0 | 10.0 | 10.0 | 10.0 |
| IGEPAL ® BC/9 | 5.0 | — | — | — |
| ALKAMULS ® T/20 | — | 5.0 | — | — |
| RHODAFAC ® PS/19 | — | — | 5.0 | — |
| AOS | — | — | — | 14.3 |
| WATER | balance | balance | balance | balance |
| TOTAL | 100 | 100 | 100 | 100 |
| TOTAL SURFACTANT | 10.0 | 10.0 | 10.0 | 10.0 |
| STABILITY | | | | |
| 54° C. | stable | stable | stable | stable |
| 20° C. | stable | stable | stable | stable |
| 0° C. | stable | stable | stable | stable |
| −10° C. | stable | stable | stable | stable |

TABLE 5

|  | S13 | S14 | CS1 | CS2 |
|---|---|---|---|---|
| FORMULATION (wt %) | | | | |
| GLUFOSINATE (50%) | 37.0 | 37.0 | 37.0 | 37.0 |
| SULFOSUCCINATE 1 | 10.0 | — | — | — |
| SULFOSUCCINATE 2 | — | 5 | — | — |
| SULFOSUCCINATE 3 | — | 7.5 | — | — |
| GEROPON ® CYA/75 | — | — | 6.7 | — |
| GERONOL ® CF/AS30HL | — | 24.8 | 20 | — |
| MIRATAINE ® ASC | 20.0 | — | — | — |
| GERONOL ® N70K | — | — | — | 20.0 |
| WATER | balance | balance | balance | balance |
| TOTAL | 100 | 100 | 100 | 100 |
| TOTAL SURFACTANT | 15.0 | 14 | 7.8 | 14.0 |
| STABILITY | | | | |
| 54° C. | stable | stable | hazy | stable |
| 20° C. | stable | stable | hazy | stable |
| 0° C. | stable | stable | stable | hazy |
| −10° C. | stable | stable | stable | hazy |

Results showed that the inventive compositions could remain stable under various temperatures. In contrast, the composition containing dioctyl sulfosuccinate ester (CS1) and an amphoteric surfactant exhibited poor stability under 20° C. and 54° C. Also, the composition containing an anionic surfactant (CS2) exhibited poor stability under low temperature.

Example 2—Efficacy Tests

Glufosinate compositions were prepared according to the formulations in upper panel of Tables 6-10 below. Efficacy of the formulations was tested on *Digitaria sanguinalis* (L.) Scop. The plants were cultured under room temperature and sprayed with the glufosinate formulations when the plants reached 3-leaves stage. The dosage of the glufosinate formulation was 60 ml/acre (200 g active/L). A group of untreated plants was used as control.

For evaluation of herbicidal efficacy, all plants tested were examined by a skilled technician, who recorded percentage of inhibition, a visual measurement of the effectiveness of each treatment group (in triplicate) by comparison with the control group (untreated plants, in triplicate). Inhibition of 0% indicates no killing effect, and inhibition of 100% indicates that all of the plants are completely dead. Results are shown in lower panel of Tables 6-10 below:

TABLE 6

| FORMULATION (wt %) | S15 | S16 | CS3 | CS4 | CS5 |
|---|---|---|---|---|---|
| GLUFOSINATE(50%) | 37.0 | 37.0 | 37.0 | 37.0 | 37.0 |
| SULFOSUCCINATE 1 | — | 10.0 | — | — | 20.0 |
| SULFOSUCCINATE 2 | 5.0 | — | 10.0 | — | — |
| SULFOSUCCINATE 3 | 7.5 | — | — | — | — |
| GERONOL ® | 24.8 | — | 25.7 | 25.7 | — |
| WATER | balance | balance | balance | balance | balance |
| TOTAL | 100 | 100 | 100 | 100 | 100 |
| TOTAL SURFACTANT | 14.0 | 10.0 | 14.0 | 10.0 | 10.0 |
| EFFICACY (%) | 90.9 | 92.5 | 85.0 | 86.9 | 80.2 |

TABLE 7

| FORMULATION (wt %) | S17 | S18 | S19 | S20 | S21 |
|---|---|---|---|---|---|
| GLUFOSINATE(50%) | 37.0 | 37.0 | 37.0 | 37.0 | 37.0 |
| SULFOSUCCINATE 1 | 10.0 | 10.0 | 10.0 | 10.0 | 10.0 |
| MIRATAINE ® CAB | 20.0 | — | — | — | — |
| MIRATAINE ® CBS 35 | — | 20.0 | — | — | — |
| MACKAM ® LHS | — | — | 20.0 | — | — |
| MACKAM ® DP-122 | — | — | — | 20.0 | — |
| MIRATAINE ® ASC | — | — | — | — | 20.0 |
| WATER | balance | balance | balance | balance | balance |
| TOTAL | 100 | 100 | 100 | 100 | 100 |
| TOTAL SURFACTANT | 12.0 | 12.0 | 11.0 | 11.0 | 15.0 |
| EFFICACY (%) | 89.4 | 89.7 | 91.3 | 89.6 | 92.0 |

TABLE 8

| FORMULATION (wt %) | S22 | S23 | S24 |
|---|---|---|---|
| GLUFOSINATE(50%) | 37.0 | 37.0 | 37.0 |
| SULFOSUCCINATE 1 | 10.0 | 10.0 | 10.0 |
| MACKAM ® OIP-40 | 20.0 | — | — |
| MIRATAINE ® H2C-HA | — | 20.0 | — |
| MIRANOL ® C2M-SF CONC | — | — | 20.0 |
| WATER | balance | balance | balance |
| TOTAL | 100 | 100 | 100 |
| TOTAL SURFACTANT | 14.8 | 13.6 | 12.8 |
| EFFICACY (%) | 90.3 | 89.5 | 94.0 |

TABLE 9

| FORMULATION (wt %) | S25 | S26 | S27 | S28 | S29 |
|---|---|---|---|---|---|
| GLUFOSINATE(50%) | 37.0 | 37.0 | 37.0 | 37.0 | 37.0 |
| SULFOSUCCINATE 1 | 6.0 | — | 5.0 | 10.0 | 10.0 |
| SULFOSUCCINATE 2 | — | 5.0 | — | — | — |
| SULFOSUCCINATE 3 | — | 7.5 | — | — | — |
| FENTACARE ® 1231 | 19.0 | 26.2 | 16.3 | — | — |
| GERONOL ® CF/K | — | — | 5.0 | — | — |
| AOS | — | — | — | 14.3 | — |
| RHODAFAC ® PS/19 | — | — | — | — | 5.0 |
| WATER | balance | balance | balance | balance | balance |
| TOTAL | 100 | 100 | 100 | 100 | 100 |
| TOTAL SURFACTANT | 10.0 | 14.0 | 10.0 | 10.0 | 10.0 |
| EFFICACY (%) | 90.6 | 96.5 | 96.6 | 93.9 | 97.7 |

TABLE 10

| FORMULATION (wt %) | S32 | S33 | S34 | S35 |
|---|---|---|---|---|
| GLUFOSINATE(50%) | 37.0 | 37.0 | 37.0 | 37.0 |
| SULFOSUCCINATE 1 | 10.0 | 10.0 | 10.0 | 10.0 |
| ALKAMULS ® OR/36 | 5.0 | — | — | — |
| RHODAMEEN ® T15 | — | 5.0 | — | — |
| IGEPAL ® BC/9 | — | — | 5.0 | — |
| ALKAMULS ® T/20 | — | — | — | 5.0 |
| WATER | balance | balance | balance | balance |
| TOTAL | 100 | 100 | 100 | 100 |
| TOTAL SURFACTANT | 10.0 | 10.0 | 10.0 | 10.0 |
| EFFICACY (%) | 92.6 | 92.2 | 96.7 | 94.9 |

Results showed that the inventive compositions, which contain the sulfosuccinate surfactant component and the additional surfactant according to the present invention exhibited excellent efficacy in killing the weeds. In contrast, the composition containing the additional surfactant alone (CS4) and the composition containing the sulfosuccinate surfactant component alone (CS5) exhibited lower efficacy. The composition containing an alkyl alcohol sulfosuccinic acid monoester alone (CS3) also exhibited lower efficacy, compared to the inventive compositions.

Example 3—Viscosity Tests

In general, pesticidal formulations with moderate viscosity are preferred by users. Preferably, viscosity of the pesticidal formulations is in the range of 100 to 800 mPa·S., more preferably, in the range of 100 to 400 mPa·s. Viscosity of formulations containing a single sulfosuccinate surfactant and those containing combination of sulfosuccinate surfactants were compared. Viscosity was measured on a Brookfield DV-II viscometer by using spindle #4, rpm of 100, under 20° C. The formulations tested and viscosity results are shown in Tables 11 and 12 below.

TABLE 11

| FORMULATION (wt %) | S36 | CS6 | CS7 | S37 | CS8 | CS9 |
|---|---|---|---|---|---|---|
| GLUFOSINATE (50%) | 37.0 | 37.0 | 37.0 | 37.0 | 37.0 | 37.0 |
| SULFOSUCCINATE 1 | — | — | — | — | — | — |
| SULFOSUCCINATE 2 | 5.0 | — | 10.0 | 5 | — | 10.0 |
| SULFOSUCCINATE 3 | 7.5 | 15 | — | 6.5 | 12.9 | — |
| GERONOL ® CF/AS30HL | 24.8 | 24.0 | 25.7 | — | — | — |

TABLE 11-continued

| FORMULATION (wt %) | S36 | CS6 | CS7 | S37 | CS8 | CS9 |
|---|---|---|---|---|---|---|
| FENTACARE ® OA-CAPO | — | — | — | 10.0 | 10.0 | 10.0 |
| WATER | balance | balance | balance | balance | balance | balance |
| TOTAL | 100 | 100 | 100 | 100 | 100 | 100 |
| TOTAL SURF. (solid con; wt %) | 14.0 | 14.0 | 14.0 | 7.0 | 7.0 | 7.0 |
| VISCOSITY (mPa · s) | 362 | 56 | >2000 | 112 | 38 | 938 |

TABLE 12

| FORMULATION (wt %) | S38 | CS10 | CS11 |
|---|---|---|---|
| GLUFOSINATE(50%) | 37.0 | 37.0 | 37.0 |
| SULFOSUCCINATE 1 | 10 | — | — |
| SULFOSUCCINATE 2 | — | — | 10.0 |
| SULFOSUCCINATE 3 | — | 12.9 | — |
| GERONOL ® N70K | 13 | 10.0 | 10.0 |
| WATER | balance | balance | balance |
| TOTAL | 100 | 100 | 100 |
| TOTAL SURF. (solid con.; wt %) | 14.1 | 12.0 | 12.0 |
| VISCOSITY (mPa · s) | 350 | 1958 | 1270 |

Results show that formulations containing the sulfosuccinate surfactant component according to the invention exhibited satisfactory viscosity. Without wishing to be bound by theory, it is believed that combination of an alkylsulfosuccinic acid monoester and a fatty alcohol polyglycol ether sulfosuccinic acid monoester can provide optimal viscosity profile to the formulations, comparing to the alkylsulfosuccinic acid monoester alone or the fatty alcohol polyglycol ether sulfosuccinic acid monoester alone.

The invention claimed is:

1. A pesticidal composition, comprising:
(a) an effective amount of a pesticide selected from the group consisting of glufosinate, glyphosate, water soluble glufosinate salts, water soluble glyphosate salts and a mixture thereof;
(b) a sulfosuccinate surfactant component, comprising at least a compound according to the general formula (I) and a compound according to the general formula (II):

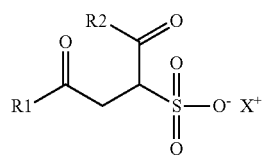
(I)

wherein:
one of $R_1$ and $R_2$ is

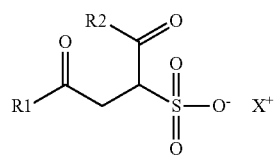 or,

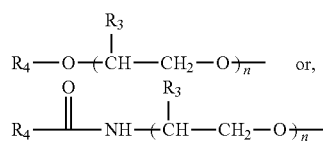

the other of $R_1$ and $R_2$ is $—OX^+$, $R_3$ is H, $C_1$-$C_4$ alkyl, alkenyl, hydroxyalkyl or hydroxyalkenyl, $R_4$ is $C_8$-$C_{16}$ alkyl or hydroxyalkyl, n is an integer of 1 to 30, each $X^+$ is H or a cation,

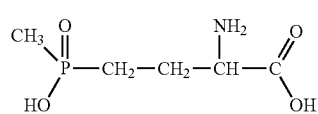
(II)

wherein:
one of $R_1$ and $R_2$ is $—OR_5$, the other of $R_1$ and $R_2$ is $—OX^+$, $R_5$ is $C_8$-$C_{16}$ alkyl, alkenyl or hydroxyalkyl, each $X^+$ is H or a cation; and (c) an additional surfactant, wherein the additional surfactant is one or more compounds selected from cationic surfactants, amphoteric surfactants, and mixtures thereof, wherein the composition exhibits a viscosity in a range of 100 to 800 mPa·s, and wherein a weight ratio between the sulfosuccinate surfactant component (b) and the additional surfactant (c) ranges from 30/70 to 70/30.

2. The composition according to claim 1, wherein the pesticide is a glufosinate or water soluble salt thereof according to the general formula (III):

$$\begin{array}{c} CH_3 \\ \diagdown \\ P \\ \diagup \\ HO \end{array} \begin{array}{c} O \\ \| \\ \end{array} —CH_2—CH_2—\begin{array}{c} NH_2 \\ | \\ CH \end{array}—\begin{array}{c} O \\ \| \\ C \\ \diagdown \\ OH \end{array}$$
(III)

in the form of the racemate or of the L enantiomer, lower alkyl esters thereof or salts thereof with acids or bases.

3. The composition according to claim 1, wherein the sulfosuccinate surfactant component comprises at least a compound according to the general formula (IV) and the compound according to the general formula (II):

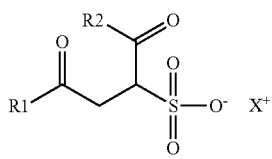

(IV)

wherein:
one of $R_1$ and $R_2$ is

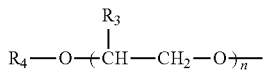

the other of $R_1$ and $R_2$ is —OX⁺,
$R_3$ is H, $C_1$-$C_4$ alkyl, alkenyl, hydroxyalkyl or hydroxyalkenyl,
$R_4$ is $C_8$-$C_{16}$ alkyl, or hydroxyalkyl,
n is an integer of 1 to 30,
each X⁺ is H or a cation.

4. The composition according to claim 1, wherein the sulfosuccinate surfactant component comprises at least a compound according to the general formula (V) and the compound according to the general formula (II):

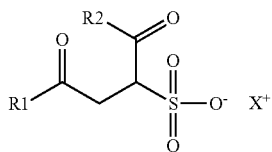

(V)

wherein:
one of $R_1$ and $R_2$ is

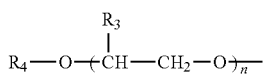

the other of $R_1$ and $R_2$ is —OX⁺,
$R_3$ is H, $C_1$-$C_4$ alkyl, alkenyl, hydroxyalkyl or hydroxyalkenyl,
$R_4$ is $C_8$-$C_{16}$ alkyl, or hydroxyalkyl,
n is an integer of 1 to 30,
each X⁺ is H or a cation.

5. The composition according to claim 1, wherein the additional surfactant is a quaternary alkylammonium salt.

6. The composition according to claim 1, wherein the additional surfactant is selected from the group consisting of betaine, amidobetaine, sulfobetaine, amido sulfobetaine, and mixtures thereof.

7. The pesticidal composition of claim 1, wherein:
(b) the sulfosuccinate surfactant component is present in an amount of from 0.01 wt. % to 30 wt. %, based on the total weight of the composition, and
(c) the additional surfactant is present in an amount of from 0.01 wt. % to 30 wt. %, based on the total weight of the composition.

8. A method for controlling undesired plants which comprises applying the composition according to claim 1 to the plants.

9. A liquid pesticidal composition, comprising:
(a) an effective amount of a pesticide;
(b) a sulfosuccinate surfactant component, comprising at least a compound according to the general formula (I) and a compound according to the general formula (II):

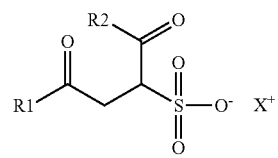

(I)

wherein:
one of $R_1$ and $R_2$ is

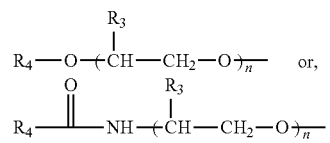

the other of $R_1$ and $R_2$ is —OX⁺,
$R_3$ is H, $C_1$-$C_4$ alkyl, alkenyl, hydroxyalkyl or hydroxyalkenyl,
$R_4$ is $C_8$-$C_{16}$ alkyl, or hydroxyalkyl,
n is an integer of 1 to 30,
each X⁺ is H or a cation,

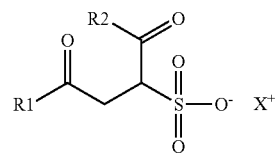

(II)

wherein:
one of $R_1$ and $R_2$ is —OR₅,
the other of $R_1$ and $R_2$ is —OX⁺,
$R_5$ is $C_8$-$C_{16}$ alkyl, or hydroxyalkyl,
each X⁺ is H or a cation;
(c) an additional surfactant, wherein the additional surfactant is one or more compounds selected from cationic surfactants, nonionic surfactants, anionic surfactants, amphoteric surfactants, and mixtures thereof; and
(d) a liquid carrier,
wherein the composition exhibits a viscosity in a range of 100 to 800 mPa·s, and
wherein a weight ratio between the sulfosuccinate surfactant component (b) and the additional surfactant (c) ranges from 30/70 to 70/30.

10. The liquid pesticidal composition according to claim 9, wherein the sulfosuccinate surfactant component is present in an amount of from 0.01 wt. % to 30 wt. %, based on the total weight of the composition.

11. The liquid pesticidal composition according to claim 9, wherein the additional surfactant is present in an amount of from 0.01 wt. % to 30 wt. %, based on the total weight of the composition.

12. A method for controlling undesired plants which comprises applying the composition according to claim 9 to the plants.

* * * * *